(12) United States Patent
Formanski et al.

(10) Patent No.: US 7,258,937 B2
(45) Date of Patent: Aug. 21, 2007

(54) GAS HUMIDIFICATION FOR CATHODE SUPPLY OF A PEM FUEL CELL

(75) Inventors: Volker Formanski, Wiesbaden (DE); Thomas Herbig, Darmstadt (DE)

(73) Assignee: General Motors Corporation, Detroit, MI (US)

( * ) Notice: Subject to any disclaimer, the term of this patent is extended or adjusted under 35 U.S.C. 154(b) by 394 days.

(21) Appl. No.: 10/623,991

(22) Filed: Jul. 21, 2003

(65) Prior Publication Data

US 2005/0019640 A1 Jan. 27, 2005

(51) Int. Cl.
*H01M 8/04* (2006.01)

(52) U.S. Cl. ............................. 429/17; 429/24; 429/25

(58) Field of Classification Search ................ 429/17, 429/24, 25
See application file for complete search history.

(56) References Cited

U.S. PATENT DOCUMENTS

| | | | | |
|---|---|---|---|---|
| 4,202,933 A * | 5/1980 | Reiser et al. | ................. | 429/13 |
| 4,859,545 A * | 8/1989 | Scheffler et al. | ............... | 429/17 |
| 5,432,020 A | 7/1995 | Fleck | .......................... | 429/13 |
| 5,434,016 A | 7/1995 | Benz et al. | ................... | 429/13 |
| 5,645,950 A * | 7/1997 | Benz et al. | ................... | 429/13 |
| 5,935,725 A | 8/1999 | Dhar et al. | ................... | 429/12 |
| 5,952,119 A | 9/1999 | Wilson | ........................ | 429/34 |
| 6,136,462 A | 10/2000 | Kriechbaum | .................. | 429/24 |
| 6,268,074 B1 | 7/2001 | Siepierski et al. | ............ | 429/13 |
| 6,350,535 B1 | 2/2002 | Kralick | ......................... | 429/13 |
| 6,376,111 B1 | 4/2002 | Mathias et al. | ............... | 429/13 |
| 2003/0219636 A1 * | 11/2003 | Kaufmann | .................... | 429/17 |
| 2005/0147862 A1 | 7/2005 | Knoop et al. | ................. | 429/34 |

FOREIGN PATENT DOCUMENTS

| | | |
|---|---|---|
| DE | 4032652 A1 | 4/1992 |
| DE | 10155217 A1 | 5/2003 |
| EP | 0629013 B2 | 5/2000 |

* cited by examiner

*Primary Examiner*—Stephen Kalafut
*Assistant Examiner*—Thomas H. Parsons
(74) *Attorney, Agent, or Firm*—Harness, Dickey & Pierce, P.L.C.

(57) ABSTRACT

A method of regulating a relative humidity of a gas supplied to a cathode side of a fuel cell stack includes controlling a flow of feedback gas from the cathode side to a compressor to adjust the relative humidity of the gas. Injected water into the compressor is vaporized in the compressor to further adjust the relative humidity of the gas. The gas is discharged at a pressure that is sufficient for use in the fuel cell stack. Water is injected into the compressor. Vaporizing is achieved using heat generated through compression. A compression pressure of the compressor is adjusted based on a quantity of the water to vaporize the water therein.

18 Claims, 3 Drawing Sheets

GAS HUMIDIFICATION FOR CATHODE SUPPLY OF A PEM FUEL CELL

FIELD OF THE INVENTION

The present invention relates to fuel cells, and more particularly to regulating humidity of a gas supplied to a cathode side of a fuel cell.

BACKGROUND OF THE INVENTION

In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive, solid polymer electrolyte membrane having the anode catalyst on one face and the cathode catalyst on the opposite face.

Performance of the PEM fuel cell is sensitive to local hydration levels of the PEM. A dry PEM results in significantly reduced performance. Sever dehydration of the PEM fuel cell can result in irreversible damage to the MEA. Accordingly, humidity management of the PEM fuel cell is important. The supply of the fuel cell reactants, anode and cathode gases, requires proper conditioning of humidity, temperature and pressure.

For the cathode side, a compressor or blower is traditionally provided to achieve the appropriate cathode gas pressure and to drive the cathode gas through the fuel cell system. A cooler is also provided to cool the compressed cathode gas to an appropriate operational temperature. Also, a humidifier is traditionally provided to achieve the requisite cathode gas humidity.

The additional cathode gas conditioning equipment increases the cost and complexity of the fuel cell system, as well as occupying valuable space in applications such as a vehicle. Further, traditional humidifying equipment is unable to achieve an optimal cathode gas humidity without adversely affecting other operational parameters of the fuel cell system.

SUMMARY OF THE INVENTION

The present invention provides a method of regulating a relative humidity of a gas supplied to a cathode side of a fuel cell stack. The method includes controlling a flow of feedback gas from the cathode side to a compressor to adjust the relative humidity of the gas. Water is vaporized in the compressor to further adjust the relative humidity of the gas. The gas is discharged at a pressure that is sufficient for use in the fuel cell stack.

In one feature, water is injected into the compressor.

In another feature, vaporizing is achieved using heat generated through compression. A compression pressure of the compressor is adjusted based on a quantity of the water to be vaporized therein.

In another feature, the flow of feedback gas is used optionally.

In still another feature, the relative humidity is held to a target value.

In another feature, the feedback gas is saturated.

In yet another feature, the feedback gas is super-saturated.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
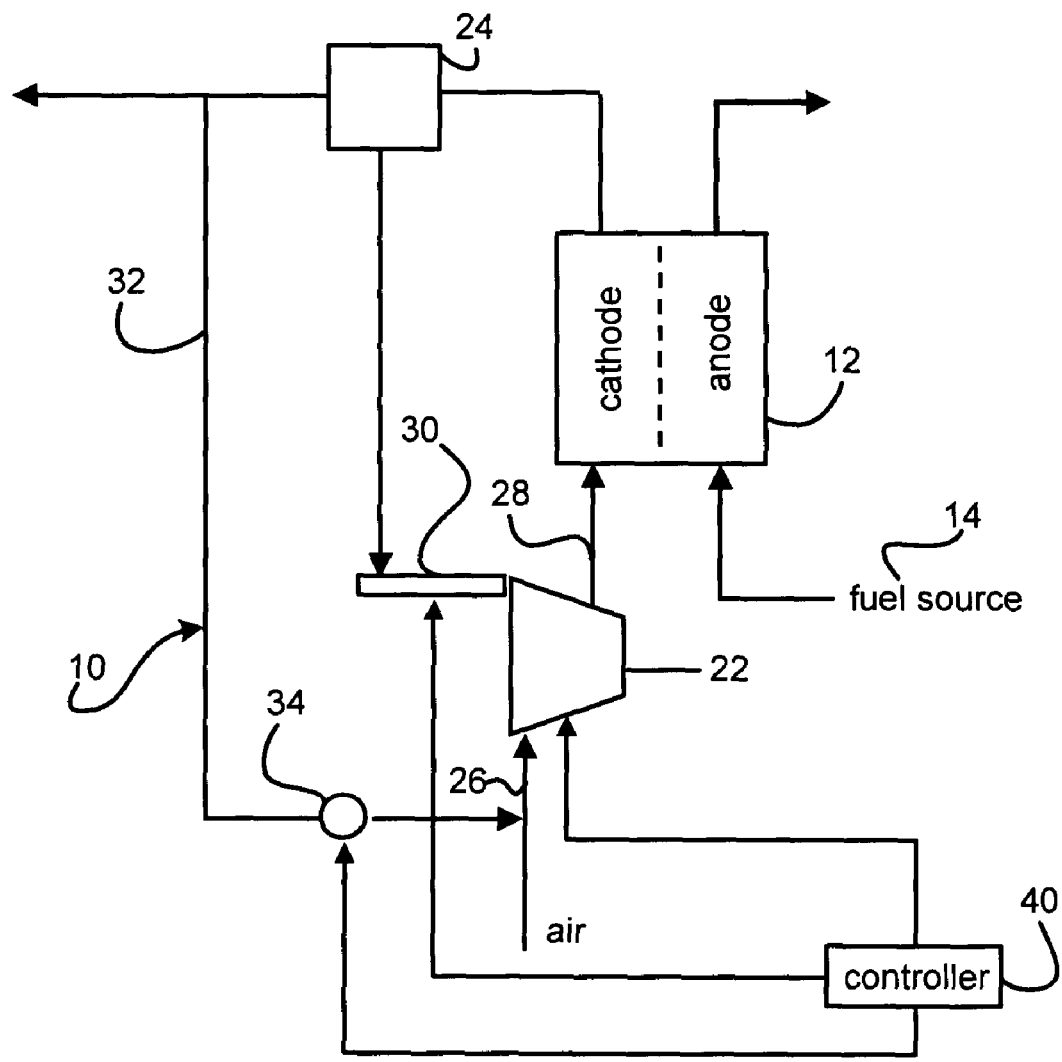
FIG. 1 is a functional block diagram of a fuel cell system including a fuel cell and compressor.

Referring now to FIG. 1, an exemplary fuel cell system 10 is shown and includes a fuel cell stack 12. The fuel cell system 10 includes a fuel source 14 that provides fuel.

The amount of air may vary as design requirements dictate.

Oxidant is supplied to the fuel cell stack 12 to catalytically react with the hydrogen-rich reformate. Typically, the oxidant is oxygen-rich air supplied by the compressor 22. The air is supplied to the fuel cell stack 12. The appropriate humidity of the air is achieved during compression within the compressor 22.

The compressor 22 can be one of various kinds of known compressors including but not limited to piston, screw, scroll or pancake. The compressor 22 includes a compression chamber (not shown), a suction inlet 26, a discharge outlet 28 and a water injector 30. Air is drawn into the compressor 22 through the suction inlet 26, is compressed within the compression chamber and is discharged to the fuel cell stack 12 through the discharge outlet 28. The air is discharged at a desired temperature and pressure for reaction within the fuel cell stack 12.

Water is supplied to the water injector 30 from a water separator 24. The water is injected into the compression chamber as a spray or mist. The water is vaporized within the compression chamber by the heat of compression. In this manner, the humidity of the discharged air is regulated. As discussed further below, the water injection process alone, however, limits other aspects of fuel cell system operation.

Figure 2:
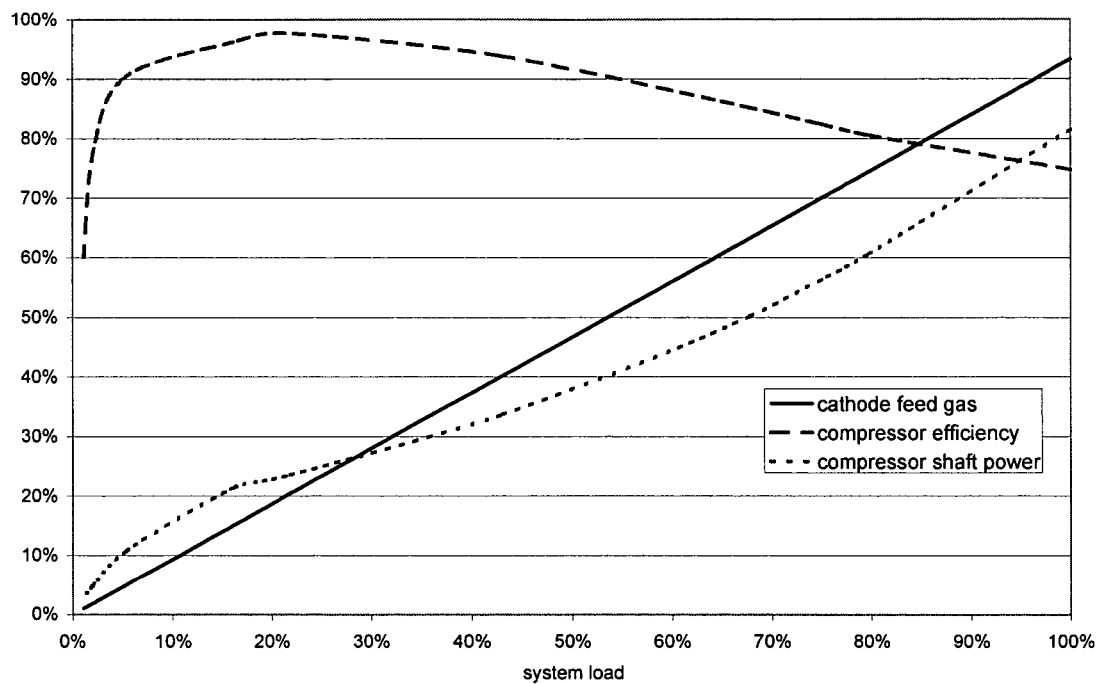
FIG. 2 is a graph illustrating characteristics of the compressor based on system load.
Figure 3:
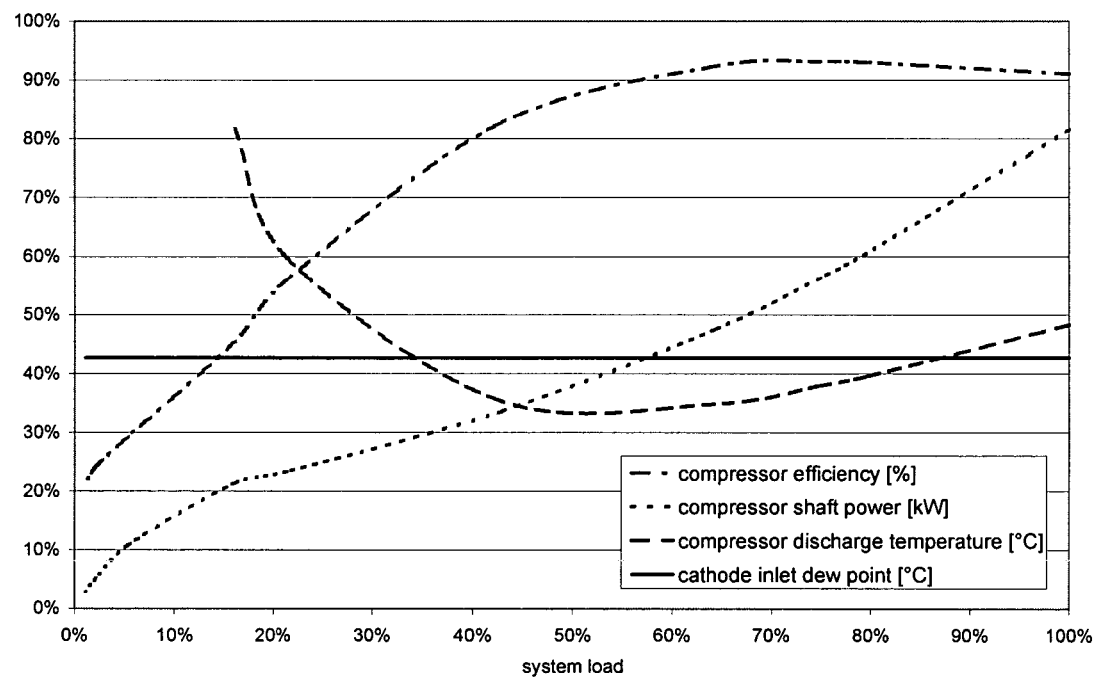
FIG. 3 is a graph illustrating a discharge temperature curve of the compressor based on system load.

Referring now to FIGS. 2 and 3, typical compressor characteristics are illustrated for operation at a certain cathode inlet relative humidity ($RH_{cath,in}$), a certain discharge pressure ($P_{discharge}$) and a certain cathode stoichiometry ($\lambda_{cath}$). The compressor characteristics include cathode feed gas flow (g/s), compressor efficiency (%), compressor power (kW), compressor discharge temperature (° C.) and cathode inlet dew point (° C.). The cathode feed gas linearly increases with the fuel cell system load. The compressor efficiency increases to a point and becomes fairly constant. The goal of an optimized fuel cell system is to hold the internal electrical requirements of the fuel cell system as low as possible. Therefore, it is desirable to maintain the compressor efficiency at its highest levels.

With water injection alone, the humidity and discharge temperature can only be regulated by the amount of water injected into the compression chamber and the pressure setting (compression pressure) of the compressor 22. The compression pressure influences operation of the fuel cell system 10. Further, the discharge pressure is limited by the vaporization process within the compression chamber. This reduces the compressor efficiency as compressor power is required to vaporize the injected water.

As seen in FIG. 3, in the central system load area or operational area, the compressor discharge temperature falls below the dew point temperature required to maintain a certain relative humidity. In other words, because the theoretical discharge temperature is below the dew point, the complete vaporization of the injected water is not possible, altering the relative humidity of the cathode gas flow. Thus, the compressor power is insufficient to achieve complete vaporization in this operational area. It should be noted, that the maximum compressor efficiency is achieved in this operational area. The reduction in compressor efficiency due to vaporization works against the goal of holding the internal electrical requirements of the system as low as possible.

To resolve the limitations of humidification by water injection alone, humid cathode exhaust gas is fed back or is recycled to the compressor 22 through a feedback conduit 32. The feedback conduit 32 is connected to the suction inlet 26. A metering device 34 controls the rate of flow of the feedback gas to the suction inlet 26. Metering device 34 is located between the exhaust outlet of the fuel cell stack 12 and suction inlet 26. More specifically, metering device 34 is located between water separator 24 and suction inlet 26. Fresh air and the feedback gas are mixed in the suction inlet 26 and are drawn into the compressor 22. The feedback gas has a relative humidity of at least 100%. The feedback gas stabilizes the water vaporization process within the compressor 22 and provides another parameter for regulating the relative humidity and discharge temperature. For example, by increasing the feedback gas flow the amount of injected water can be decreased.

A controller 40 communicates with the compressor 22, the injector 30 and the metering device 34. The controller 40 regulates the relative humidity of the gas supplied to the cathode side of the fuel cell stack 12. The controller 40 controls the amount of air injected into the compressor 22. The controller 40 controls the compression pressure of the compressor 22 based on the amount of injected water to enable complete vaporization of the water. The compression pressure can be determined in a number of manners including a look-up table or a calculation based on the amount of water injected into the compressor 22. Further, the controller 40 adjusts the metering device 34 to control the rate of flow of the feedback gas to the suction inlet 26.

Figure 4:
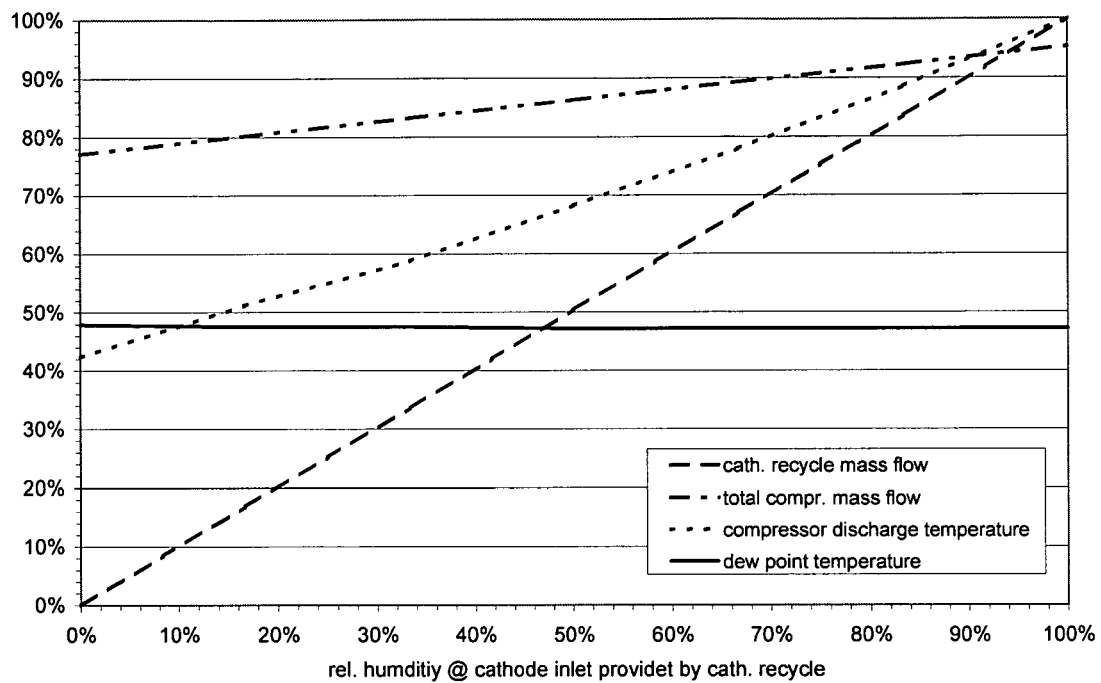
FIG. 4 is a graph illustrating fuel cell system characteristics based on a relative humidity increase attributed to a feedback gas flow.
Figure 5:
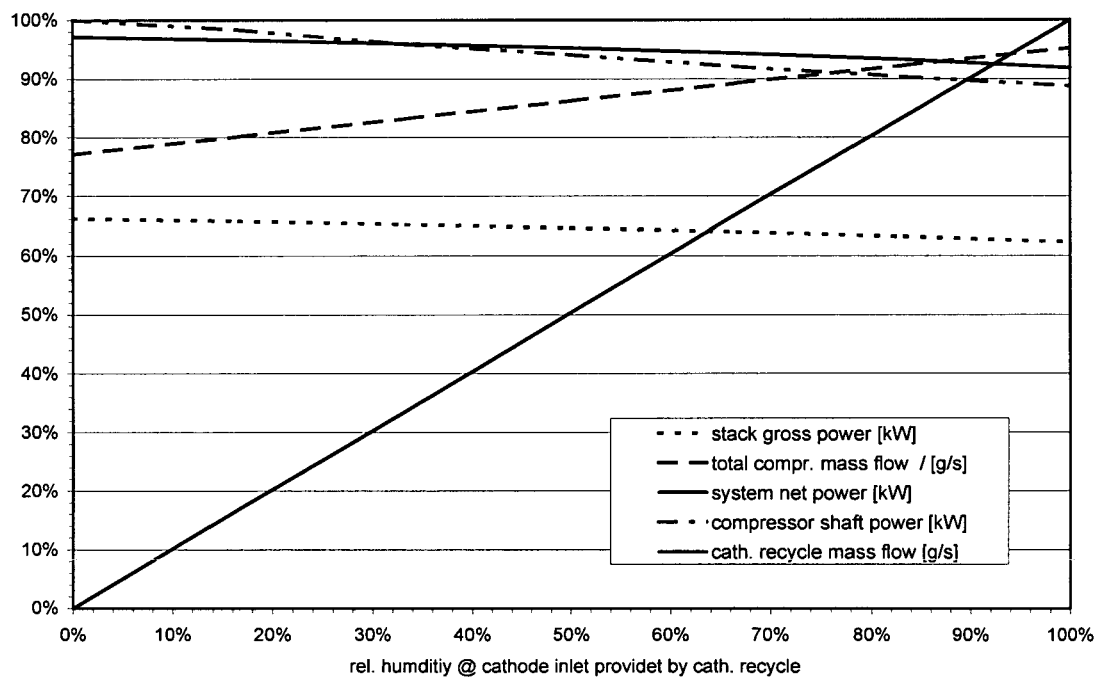
FIG. 5 is a graph illustrating additional fuel cell system characteristics based on the relative humidity increase attributed to the feedback gas flow.

Referring now to FIGS. 4 and 5, characteristics are shown for the fuel cell system 10 based on the relative humidity attributed to the feedback gas flow. Exemplary certain operating parameters of the fuel cell system 10 are used. It is appreciated that these operating parameters are merely exemplary in nature and may vary to operate the fuel cell system 10 as desired. The characteristics of FIG. 4 include feedback gas mass flow, total compressor mass flow, compressor discharge temperature and dew point temperature. The additional characteristics of FIG. 5 include gross power output of the fuel cell stack 12, net power output of the fuel cell system 10 and compressor power As seen in FIG. 4, the compressor discharge temperature increases as the feedback gas flow is increased. Without the feedback gas, the desired relative humidity is not achievable by water injection alone. As seen in FIG. 5, the compressor power drops with increased feedback gas flow. Although the compressor power drops, the net system power drops as a result of the decreasing gross fuel cell power output. This is a result of a reduction in the efficiency of the fuel cell stack 12 because of a reduction in the partial pressure of oxygen within the cathode side. Increasing the feedback gas flow correspondingly decreases the partial pressure of oxygen within the cathode. The influence of the feedback gas on power output, however, is sufficiently limited in the range required to provide stable humidity control.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fluid flow system to adjust a humidity of a gas supplied in a fuel cell system, comprising:
    a fuel cell stack having a cathode inlet and a cathode exhaust;
    a compressor that draws in a mixture of fresh gas and humidified exhaust gas from said cathode exhaust and compresses said mixture therein;
    a metering device to adjust a flow of said cathode exhaust gas to said compressor,
    an injector injecting water into said mixture within said compressor, said compressor supplying said mixture to said cathode inlet; and
    a controller that controls said metering device, said injector and said compressor to adjust the humidity.

2. The fluid flow system of claim 1 wherein a rate of cathode exhaust gas flow is controlled to adjust the humidity.

3. The fluid flow system of claim 1 wherein an amount of water injected into said compressor is controlled to adjust the humidity.

4. The fluid flow system of claim 1 wherein a compression pressure of said compressor is adjusted based on an amount of water injected into said compressor.

5. The fluid flow system of claim 4 wherein said compression pressure is adjusted to vaporize said water during compression.

6. A method of regulating a humidity of a cathode supply gas to a cathode side of a fuel cell stack, comprising:
    mixing the cathode supply gas with a controlled quantity of feedback gas from said cathode side to effect a relative humidity of the cathode supply gas, said controlled quantity of cathode feedback gas adjusted based on a desired relative humidity of said cathode supply gas;
    injecting water into the cathode supply gas to further effect said relative humidity of the cathode supply gas; and
    compressing the cathode supply gas in a compressor.

7. The method of claim 6 wherein the cathode supply gas is air.

8. The method of claim 6 further comprising vaporizing said water within said compressor.

9. The method of claim 8 wherein said vaporizing is achieved using heat generated through compression.

10. The method of claim 8 further comprising adjusting a compression pressure of said compressor based on a quantity of said water to vaporize said water therein.

11. A method of regulating a relative humidity of a gas supplied to a cathode side of a fuel cell stack, comprising:
controlling a flow of feedback gas from said cathode side to a compressor to adjust said relative humidity of the gas;
injecting water into said compressor, controlling the water injection to adjust said relative humidity;
vaporizing water in said compressor to further adjust said relative humidity of the gas; and
discharging the gas at a pressure sufficient for use in the fuel cell stack.

12. The method of claim 11 wherein said vaporizing is achieved using heat generated through compression.

13. The method of claim 12 further comprising adjusting a compression pressure of said compressor based on a quantity of said water to vaporize said water therein.

14. The method of claim 11 wherein said feedback gas is saturated.

15. The method of claim 11 wherein said feedback gas is super-saturated.

16. A method of regulating a relative humidity of a gas, comprising:
controlling a flow of feedback gas to a compressor to adjust said relative humidity of said gas;
injecting water into said compressor, controlling the water injection to adjust said relative humidity; and
vaporizing water injected into said compressor to further adjust said relative humidity of said gas.

17. The method of claim 16 wherein said feedback gas is saturated.

18. The method of claim 16 wherein said feedback gas is super-saturated.

* * * * *